United States Patent [19]
Weigel

[11] 3,894,219
[45] July 8, 1975

[54] HYBRID ANALOG AND DIGITAL COMB FILTER FOR CLUTTER CANCELLATION

[75] Inventor: Wayne L. Weigel, Ellicott City, Md.
[73] Assignee: Westinghouse Electric Corporation, Pittsburgh, Pa.
[22] Filed: Jan. 16, 1974
[21] Appl. No.: 433,958

[52] U.S. Cl. ...... 235/150.5; 340/15.5 CF; 343/5 DP
[51] Int. Cl. .............................................. G06j 1/00
[58] Field of Search ................ 235/150.5, 152, 181; 333/18, 70 T; 328/162; 325/42; 343/5 DP; 340/15.5 CF

[56] References Cited
UNITED STATES PATENTS

| | | | |
|---|---|---|---|
| 3,177,349 | 4/1965 | Zaborsky et al. | 235/152 |
| 3,303,335 | 2/1967 | Pryor | 235/150.5 X |
| 3,404,399 | 10/1968 | Eschner, Jr. | 343/5 DP |
| 3,422,435 | 1/1969 | Cragon et al. | 343/5 DP |
| 3,789,199 | 1/1974 | Kotwicki | 235/150.5 |

*Primary Examiner*—Joseph F. Ruggiero
*Attorney, Agent, or Firm*—J. B. Hinson

[57] ABSTRACT

A comb filter operative as a clutter canceller in a radar system is implemented as a hybrid analog and digital system, and provides a digital output signal from an analog input, radar beam return signal. The analog input signal is applied to a summer, the latter providing its output to an analog to digital (A/D) converter from which the canceller output is obtained. The A/D converter output also is applied to a digitally implemented filter, which produces a digital, time delayed replica of the input signal. A digital to analog (D/A) converter receives the digital replica signal and produces an equivalent analog signal for supply to the input summer for subtraction from the input analog signal. The summer output provides cancellation of clutter from the input signal, thereby reducing the requisite dynamic range of the A/D converter. The hybrid design of the invention thus optimally combines the advantages of analog and digital techniques while avoiding defects thereof, in affording an encoding interface between analog input and digital output signals.

10 Claims, 4 Drawing Figures

HYBRID ANALOG AND DIGITAL COMB FILTER FOR CLUTTER CANCELLATION

BACKGROUND OF THE INVENTION

1. Field of the Invention

This invention relates to a comb filter design for clutter cancellation in a radar system and, in particular, to a hybrid analog and digital implementation of such a comb filter.

2. State of the Prior Art

Radar systems have evolved over the years from a totally analog mechanization to a largely digital mechanization. A necessary and almost always limiting element of the system is an analog to digital (A/D) converter which provides an encoding interface between the analog circuitry which receives the return radar beam signals, and subsequent digital processing circuitry. To simplify the conversion, i.e., to reduce the requisite dynamic range of the A/D converter, techniques have been developed for rejecting or cancelling clutter in the main beam return.

As an example, moving target indicator (MTI) radar systems use a comb filter for the rejection of main beam clutter returns. The mechanization of such comb filters in the prior art have generally been either exclusively analog or exclusively digital in nature. Prior art analog approaches, however, suffer from environmental instabilities and lack of flexibility; conversely, prior art digital approaches, while avoiding these defects of analog designs, still impose a requirement of an undesirably large dynamic range of the A/D converter.

To illustrate further known techniques of the prior art, reference is had to FIG. 1 which illustrates in block diagram form a clutter canceller of the feed-forward type. Herein, an input analog signal comprising a radar beam return is applied in parallel paths directly to the additive input of a summer 1, and through a delay line 2 to the subtractive input of summer 1, from the output of which the clutter-cancelled, analog signal is derived. A subsequent A/D converter of reduced dynamic range thereby may be employed. However, implementation of the canceller of FIG. 1 must be in analog form with the attendant undesirable characteristics as noted.

A prior art clutter canceller, or comb filter, of the feedback type is shown in FIG. 3, in block diagram form. Herein, an input summer 5 receives at its additive input the analog input signal comprising the radar beam return. The output summer 5, also comprising the output of the canceller, is supplied to a further summer 6 at an additive input thereof, the output of summer 6 being applied to delay line 7. The output of delay line 7 is supplied to a further additive input of summer 6 and as well to the subtractive input of the input summer 5.

The clutter canceller of FIG. 3, as in the case of FIG. 1, again provides a clutter-cancelled analog output signal with the result that a subsequent A/D converter may be of reduced dynamic range; as in the feed forward circuit of FIG. 1, however, the feedback circuit of FIG. 3 must be implemented in analog fashion with the attendant undesirable characteristics of analog techniques.

Implementation of either of the systems of FIGS. 1 and 3 in digital form necessarily implies a preceding analog to digital converter with the result of requiring an undesirable large dynamic range of the converter.

The comb filter of the invention comprises a hybrid analog and digital design optimally combining the advantageous characteristics of both analog and digital techniques while avoiding their defects, and affording a marked improvement over the prior art comb filters.

SUMMARY OF THE INVENTION

In accordance with the invention, the comb filter or clutter canceller includes an input summer receiving at an additive input the analog input signal comprising the radar beam return and supplying its output to an A/D converter from which a clutter-cancelled, digital output signal is derived. The A/D converter output is also provided to a digitally implemented filter of desired filter characteristics. In the disclosed embodiment, the filter may be a single delay canceller comprising a further summer receiving the digital output of the A/D converter and providing its output to a delay line. The delay line produces as an output a replica of the digital signal made input thereto, delayed in time. The delay line output is supplied through a return loop to the further summer in additive relation to the A/D converter output. The delay line output also is supplied to a digital to analog (D/A) converter, the output thereof being provided to the input summer in subtractive relationship with the input signal.

In accordance with the invention, therefore, the A/D converter is included in the feedback loop of the clutter canceller. The critical filter element, such as comprising the further summer and delay line, thereby is implemented digitally. The input summer, which is of analog design, in summing the inputs in subtractive relationship, produces a clutter-cancelled output to the A/D converter. The A/D converter therefore may be of reduced dynamic range, greatly facilitating its implementation.

DETAILED DESCRIPTION OF THE INVENTION

Figure 1:
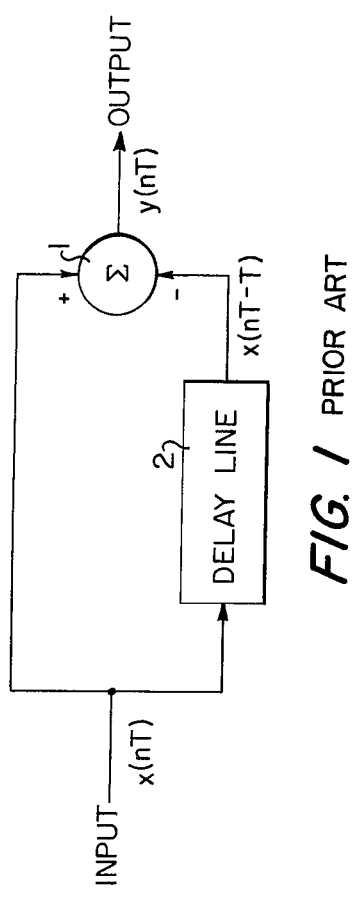
FIG. 1 is a block diagram of a prior art single-delay canceller of the feed-forward type.
Figure 3:
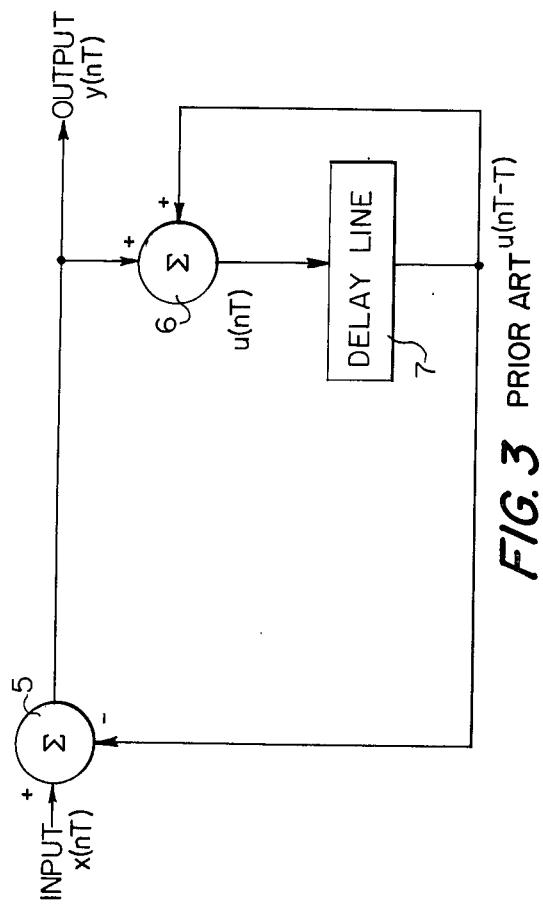
FIG. 3 is a block diagram of a prior art single-delay canceller of the feedback type.

As set forth in the discussion of the prior art, clutter cancellation schemes of both the feed-forward type of FIG. 1 and the feedback type of FIG. 3 have been developed in the prior art. Mechanization or implementation of such systems, heretofore, has been exclusively through analog techniques or exclusively through digital techniques with the concomitant and corresponding defects as noted above. Nevertheless, it is instructive to consider these prior art approaches in some further detail to appreciate the equivalency of the clutter cancellation functions achieved thereby.

Figure 2:
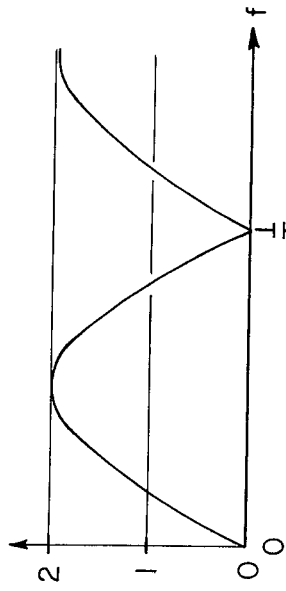
FIG. 2 is a waveform plot of the frequency response of a single-delay canceller.

In this context, reference is had to the waveform plot of FIG. 2 which illustrates the frequency response characteristic of the single-delay canceller of FIG. 1. Generally, such cancellers function to weight the input spectrum to reduce the dynamic range of a subsequent A/D converter. In this regard, the main beam clutter spectrum is centered in the nulls of the canceller weighting, usually by a frequency tracking loop.

The delay line, such as the delay line 2 in FIG. 1, effect a delay of time duration T which, as well, is the time period of a full cycle of the input signal. The delay line output is thus a time delayed replica of the input signal. An analog delay line under these conditions produces an output having the illustrated waveform characteristic of amplitude level 2 relative to an input amplitude level of 1, repeating periods of (1/T) duration and a waveform generally corresponding to successive, repeating positive half-cycles of a sine wave.

The feedback system of FIG. 3 has a system transfer function which is identical to that of FIG. 1, and accordingly has the identical pulse response characteristics as shown in FIG. 2. To demonstrate the identity of the transfer functions of the two mechanizations, the equation for the systems may be written as follows.

With reference to FIG. 1, the circuit equation relating the output $y(nT)$ to the input $x(nT)$ is as follows:

$$y(nT) = x(nT) - x(nT-T) \qquad (1)$$

where
$nT$ = the $nth$ interval $T$
$y(nT)$ = output signal at the $nth$ interval $T$
$x(nT)$ = input signal at the $nth$ interval $T$
$x(nT-T)$ = input signal for the interval preceding interval $nT$ by the time $T$.

With reference to the feedback system of FIG. 3, the output equation for the circuit may be written in terms of its identically labelled input $x(nT)$ and output $y(nT)$ as follows:

$$y(nT) = x(nT) - u(nT-T) \qquad (2)$$

where:
$u(nT-T)$ = output of delay line 18.

Further, where $u(nT)$ = output of summer 3, the equation may be written:

$$u(nT) = y(nT) + u(nT-T) \qquad (3)$$

Substituting equation (2) into equation (3) yields:

$$u(nT) = x(nT) - u(nT-T) + u(nT-T) \qquad (4)$$

which reduces to:

$$u(nT) = x(nT) \qquad (5)$$

Recognizing equation (5) to be valid for any like time period T, the time interval (nT) may be equated to the interval (nT−T) giving the equality:

$$u(nT-T) = x(nT-T) \qquad (6)$$

Substituting equation (6) into equation (2) yields:

$$y(nT) = x(nT) - x(nT-T) \qquad (7)$$

Equation (7) and equation (1) are identical. Functionally then, the circuit of FIG. 3 will produce the same results as the circuit of FIG. 1.

The frequency response of the single-delay canceller of FIG. 1 and FIG. 3 illustrated in FIG. 2, as before noted, results in the main beam return clutter spectrum being centered in the nulls of the canceller waveform response, thereby cancelling the clutter and reducing the dynamic range of the input analog signal which must be processed by a subsequent A/D converter in producing corresponding digital signals for further processing. More specifically, the A/D converter would not have to convert the full dynamic range of the input signal $x(nT)$, but instead only the difference between $x(nT)$ and its time delayed function $x(nT-T)$ as expressed in equations (1) and (7).

As before noted, implementation of either of the systems of FIGS. 1 and 3 in analog or in digital form exclusively, as attempted heretofore in the prior art, results in retaining the disadvantages of analog circuitry or, alternatively, failing to avoid the undesirably large dynamic response required of an analog to digital converter.

In accordance with the invention, however, a hybrid analog and digital system is provided which enables a digital implementation of the critical filter element of the canceller while optimally utilizing an analog implementation for cancellation of clutter from the input analog signal, thereby enabling use of an A/D converter of reduced dynamic range.

Figure 4:
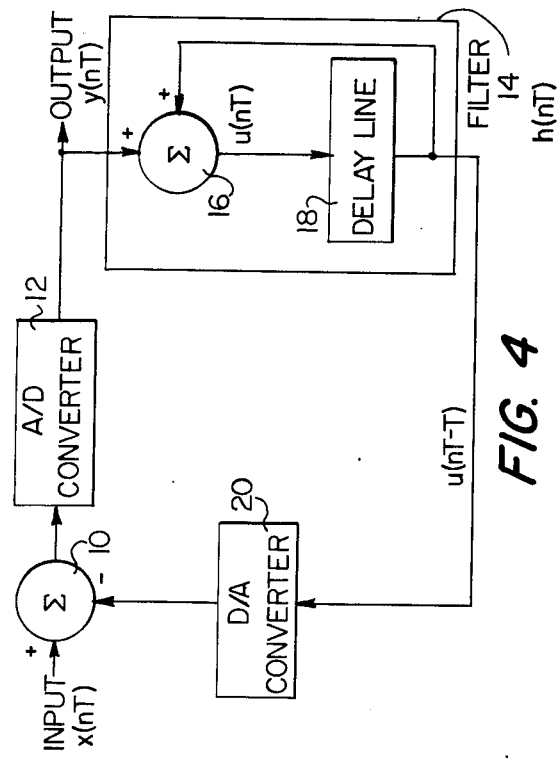
FIG. 4 is a block diagram of a hybrid analog and digital, single-delay canceller in accordance with the invention.

Specifically, as shown in FIG. 4, the input analog signal is applied to an input analog summer 10 at an additive input thereof and the output thereof is supplied to an analog to digital (A/D) converter 12 of relatively reduced dynamic range characteristics. The output of the A/D converter 12 provides the output of the canceller and, as well, is supplied to a filter 14.

The filter 14 is implemented digitally, and may take any of various forms as hereinafter discussed. Illustratively, filter 14 is shown to include a digital summer 16 and a digital delay line 18, the summer 16 receiving at additive inputs the digital output of the A/D converter 12 and the output of the delay line 18. The delay line 18 output also is supplied to a digital to analog (D/A) converter 20 for supply of an analog signal to a subtractive input of the input summer 10. The foregoing equations (2) through (7) describe as well the transfer function of the hybrid system of the invention as shown in FIG. 4.

A salient feature of the invention is that the A/D converter 12 is included in the feedback loop of the system of FIG. 4, thereby enabling use of a fully digitized filter 14; moreover, clutter cancellation is effected as an analog function in summer 10, prior to the input to the A/D converter 12, thereby enabling use of an A/D converter of reduced dynamic range.

The spectral response of a digital filter such as filter 14 is repetitive, as a function of the sampling rate. For the single delay line filter shown, the filter characteristic again has the wave shape and periodicity of the waveform shown in FIG. 2.

The system of FIG. 4 also permits ready implementation of alternative filter elements for the filter 14, and having differing waveform response characteristics. For example, multiple delay lines and multiple summers may be employed in lieu of the single delay and summer as shown.

A general expression for the characteristics of the filter 14 may be derived as follows. Where $h(nT) =$ characteristic of filter 14, and using the definitions set forth in relation to equation (1), the equation for the circuit of FIG. 4 may be written:

$$y(nT) = x(nT) - y(nT) \cdot h(nT) \quad (8)$$

and, clearing:

$$x(nT) = y(nT) \cdot [1 + h(nT)] \quad (9)$$

$$y(nT) = \left[\frac{1}{1 + h(nT)}\right] \cdot x(nT) \quad (10)$$

Where
$w(nT) =$ the transfer function of the system:

$$w(nT) = \frac{y(nT)}{x(nT)} = \frac{1}{1 + h(nT)} \quad (11)$$

Therefore:

$$h(nT) = \frac{1 - w(nT)}{w(nT)} \quad (12)$$

Thus, the characteristics of the filter 14 may readily be defined in terms of the desired transfer characteristics of the canceller; correspondingly, of course, a given filter characteristic will define the transfer characteristic of the canceller.

In FIG. 4, the converters 12 and 20 will introduce some slight delay within the loop between the output of the summer 10 and the subtractive input thereto, relative to the phasing of the analog input signal applied to the additive input of the summer 10. Generally, the time delays introduced by the converters are small relative to the periodicity of, i.e., the spacing between, successive radar pulse returns. Compensation for the converter delays thus is minimal, and, if desired, may be introduced in the filter 14. Since the delays of the converters are fixed, the delay compensation may be represented by a fixed quantity δ in the equation (12) defining the filter characteristics:

$$h(nT) = \frac{1 - w(nT)}{w(nT)} - \delta \quad (13)$$

Further control of the wave shape response characteristics of the canceller of FIG. 4 may be afforded by introducing gain in the feedback loop. This may be afforded by separate components placed in the feedback loop, or gain control may be incorporated within the D/A converter 20.

The clutter canceller of the invention accordingly comprises an optimal hybrid analog and digital design for achieving clutter cancellation in a radar system. Substantial flexibility is afforded in the design of the filter, particularly in view of the system permitting a strictly digital design for the filter element. Nevertheless, the system affords cancellation of clutter in the analog input signal thereby enabling reduction of the dynamic range of the analog to digital converter, with concomitant reduction in complexity and cost, and improved reliability and accuracy. Whereas a specific implementation of a filter of a simple, single-delay type has been shown, the general characteristics of the filter have been defined in terms of the desired system transfer function, from which it will be apparent to those skilled in the art that filters of alternative designs may be employed.

Numerous modifications and adaptations of this system of the invention will be apparent to those skilled in the art, and thus it is intended by the appended claims to cover all such modifications and adaptations which follow from the true spirit and scope of the invention.

What is claimed is:

1. A system for cancelling clutter from an analog input signal and producing a digital output signal, comprising:
   a first summer receiving the analog input signal and producing an output,
   an analog to digital converter receiving the output of said first summer and producing a corresponding digital output comprising the digital output signal of the system,
   a filter receiving the digital output of said analog to digital converter and producing as an output a filtered signal having a predetermined mathematical relationship to the output signal of the analog to digital converter,
   a digital to analog converter receiving the output of said filter and producing as an output an equivalent analog signal wherein,
   said first summer receives and sums said filtered signal in subtractive relationship with the analog input signal.

2. A system as recited in claim 1, wherein said first summer comprises an analog summer, and said filter comprises a digital filter.

3. A system as recited in claim 1, wherein said analog to digital converter includes means for sampling the analog input signal at a predetermined sampling rate, and wherein said filter produces a time delay corresponding to the period of the sampling rate.

4. A system as recited in claim 1, wherein said digital to analog converter includes adjustable gain control means for adjusting the response of the system.

5. A system as recited in claim 1, wherein the filter characteristics $h(nT)$ are defined in terms of the system transfer function $w(nT)$ in accordance with:

$$h(nT) = \frac{1 - w(nT)}{w(nT)}.$$

6. A system as recited in claim 1, wherein said filter comprises
   a further summer receiving the digital output of said analog to digital converter and producing an output,
   a delay line receiving as an input the output of said further summer and producing as an output a time delayed replica of the input thereto, said further summer receiving and summing the delay line output in additive relationship with the digital output of said analog to digital converter in producing the output to said delay line.

7. A system as recited in claim 6, wherein said further summer and said delay line respectively comprise a digital summer and a digital delay line.

8. A clutter canceller comprising:
a summer receiving an input signal $x(nT)$ and producing an output signal $y(nT)$,
a feedback loop responsive to the output $y(nT)$ of said summer and producing the function $u(nT-T) = x(nT-T)$ supplied as a feedback signal to said summer,
said summer summing the feedback signal $u(nT-T)$ in subtractive relationship with the input signal $x(nT)$ to produce as the output $y(nT) = x(nT) - x(nT-T)$ and wherein
said feedback loop includes
an analog to digital converter receiving the analog output of said summer and producing an equivalent digital output $y(nT)$;
a digital filter responsive to the digital output $y(nT)$ of said analog to digital converter and producing the function $u(nT-T)$, and
a digital to analog converter responsive to the digital function $u(nT-T)$ output of said filter to supply the equivalent analog function $u(nT-T) = x(nT-T)$ as the feedback signal to said summer.

9. A clutter canceller as recited in claim 8, wherein said filter comprises:
a digital summer receiving the digital output $y(nT)$ of said analog to digital converter and producing the function $u(nT)$ as an output, and
a digital delay line receiving the $u(nT)$ output of said digital summer and producing the function $u(nT-T)$ as an output, and
said digital summer receiving and combining the filter output function $u(nT-T)$ in additive relationship with the digital output $y(nT)$ whereby $u(nT) = y(nT) + u(nT-T)$.

10. A clutter canceller as recited in claim 8, wherein for the system transfer function $w(nT) = y(nT)/x(nT)$, said filter has characteristics $h(nT)$ defined in accordance with $$h(nT) = \frac{1 - w(nT)}{w(nT)}.$$

* * * * *